United States Patent [19]

Yamane et al.

[11] Patent Number: 5,583,691

[45] Date of Patent: Dec. 10, 1996

[54] MULTI-AXES STAGE

[75] Inventors: Motohiro Yamane; Satoshi Fukuoka, both of Tokyo, Japan

[73] Assignee: The Furukawa Electric Co., Ltd., Tokyo, Japan

[21] Appl. No.: 349,309

[22] Filed: Dec. 2, 1994

[30] Foreign Application Priority Data

Dec. 7, 1993 [JP] Japan .................................. 5-340093
Oct. 17, 1994 [JP] Japan .................................. 6-276990

[51] Int. Cl.$^6$ .................................................. G02B 21/26
[52] U.S. Cl. ........................... 359/393; 359/391; 359/392
[58] Field of Search .................................. 359/391–394, 359/896; 356/400–401, 138, 153; 108/20, 137–138, 143–147

[56] References Cited

U.S. PATENT DOCUMENTS

| | | | |
|---|---|---|---|
| 3,010,363 | 11/1961 | Malfeld ................................. | 359/393 |
| 4,905,415 | 3/1990 | Moulin ................................. | 451/276 |
| 4,914,867 | 4/1990 | Saito et al. .......................... | 451/292 |
| 4,948,330 | 8/1990 | Nomura et al. ..................... | 359/393 |
| 4,953,965 | 9/1990 | Iwase et al. ......................... | 359/846 |
| 5,038,524 | 8/1991 | Moulin ................................. | 451/548 |
| 5,165,297 | 11/1992 | Krueger .............................. | 359/393 |
| 5,228,358 | 7/1993 | Sakino et al. ....................... | 108/143 |
| 5,323,712 | 6/1994 | Kikuiri ................................. | 359/393 |

FOREIGN PATENT DOCUMENTS 349911  1/1990  Germany .............................. 359/392

Primary Examiner—Thong Nguyen
Attorney, Agent, or Firm—Frishauf, Holtz, Goodman, Langer & Chick

[57] ABSTRACT

A multi-axes stage including a table for mounting an optical component having a plurality of optical paths; and first and second actuators for vertically movably supporting the table, the actuators having a control device for adjusting the vertical movement of the table by each actuator separately, and for controlling the movement of the table in at least one of the rotating direction about the optical paths and the vertical direction.

4 Claims, 10 Drawing Sheets

F I G. 12A
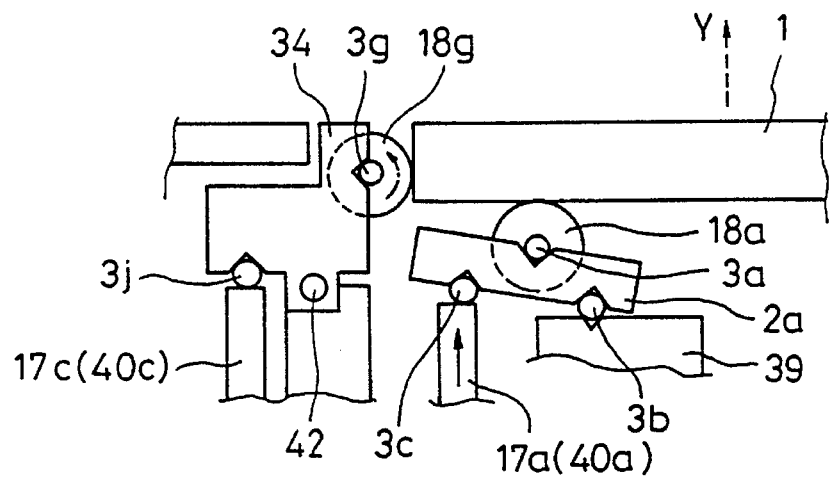
F I G. 12B
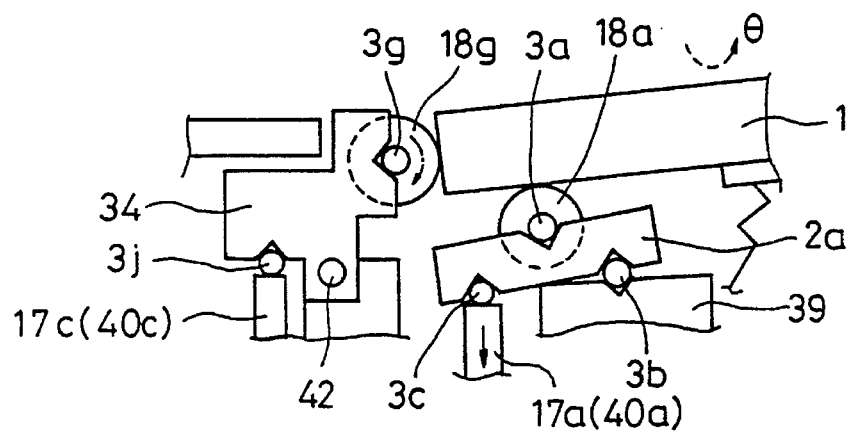
F I G. 12C
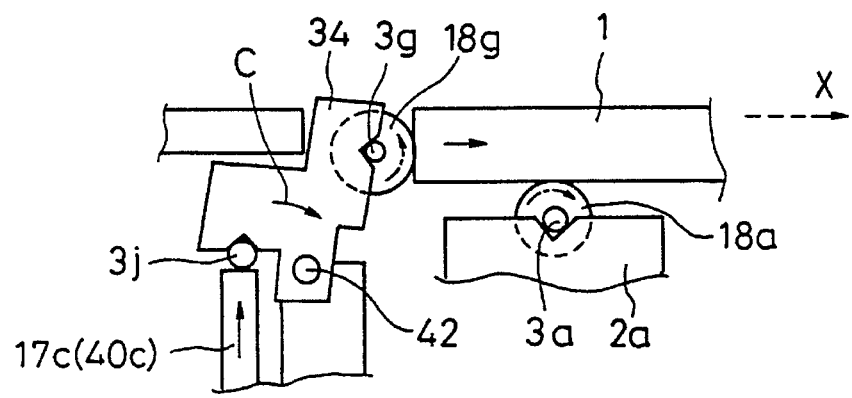

MULTI-AXES STAGE

BACKGROUND OF THE INVENTION

1. Field of the Invention

The present invention relates to a multi-axes stage for aligning an optical component having a plurality of optical paths and an optical component to be connected.

2. Description of Related Art

When a multifiber connector having a plurality of optical fibers to work as an optical path or an optical waveguide component having a plurality of optical waveguides to work as an optical path is to be connected to another, or when those optical components are to be connected with a semiconductor laser diode array having a plurality of semiconductor laser diodes, an aligning apparatus is used to make the optical axis of the optical waveguide path formed in an optical waveguide component or the optical axis of the optical fiber provided in the multifiber connector, in alignment with the optical axis of an optical component to be connected.

FIG. 15 shows an embodiment of a aligning apparatus. In the drawing, multi-axes stage 15 and fixed table 31 are provided on an arrangement base 32. Optical component 13 to be coupled is placed and held on fixed table 31.

Multi-axes stage 15 has stage holding portion 30. X stage 24 finely movable in the X axis direction, Y stage 25 finely movable in the Y axis direction, and rotating stage 26 finely movable in the rotating direction are provided on stage holding portion 30. Rotating stage 26 has table 27 for mounting an optical component, for instance, optical fiber block 23. Block 23 is removably placed on table 27. The optical axes of optical fibers provided in optical fiber block 23 are directed into the Z direction of the drawing.

X stage 24 is movable by X axis motor 20 in the X axis direction perpendicular to optical axis Z of said optical fiber mounted in optical fiber block 23, as illustrated by arrow A in the drawing. Also, Y stage 25 is movable by Y axis motor 21 in the Y axis direction perpendicular to optical axis Z of optical fiber of block 23, as illustrated by arrow B in the drawing. Rotating stage 26 can be rotated by rotating motor 22 in the θ direction in the X-Y plane of the drawing, as illustrated by arrow C, that is, in other words, in the rotating direction about said optical fiber of optical fiber block 23.

As illustrated in the drawing, when the aligning apparatus is used, optical fiber block 23 and optical component 13 are roughly aligned to face to each other. Table 27 is moved to an appropriate position by finely moving X stage 24, Y stage 25 and rotating stage 26 of multi-axes stage 15 while optical component 13 is being placed. Said aligning apparatus aligns optical axes of optical component 13 to be connected and optical fiber block 23.

According to the aligning operation as mentioned above, it is necessary to align axes of optical component 13 and optical fibers of block 23 at the accuracy of less than 1 μm, in order to make connecting loss as small as possible. Multi-axes stage 15 is designed to finely move at the accuracy of less than 1 μm.

As another embodiment, arrangement table 32 may have one more multi-axes stage 15, instead of fixed table 31. In this embodiment, optical fiber block 23 is mounted on table 27 of one multi-axes stage 15, and optical component 13 to be connected is mounted on table 27 of the other multi-axes stage 15. Alignment is made by finely moving both optical fiber block 23 and optical component 13 to be connected.

However, in the aligning apparatus shown in FIG. 15, table 27, X stage 24, Y stage 25 and rotating stage 26 are fixed to stage fixing portion 30 in the form of a cantilever. Because of the structure, in the aligning apparatus, when stress is applied to table 27 on which optical fiber block 23 is placed, for example, even if the stress is about 100 g.f, table 27 is distorted at more than 1 μm so that optical fiber block 23 cannot be placed at a desired position.

Accordingly, for instance, if table 27 is distorted when optical fiber block 23 is set, optical fiber block 23 is considerably deviated relative to optical component 13. Due to this, it may take a very long time to align those components. In addition, when optical fiber block 23 and optical component 13 are fixed to each other by an adhesive after the alignment operation is finished, block 23 and component 13 may be moved due to a shrinkage force, table 27 being moved from the alignment position, or the like, so that problems are caused such that the alignment accuracy may become worse.

SUMMARY OF THE INVENTION

The object of the invention is to provide a multi-axes stage which can prevent the movement of optical components from occurring when an optical component, for example, a multifiber connector is set or such a component and another optical component to be connected are fixed, in the case that an optical component, i.e., a multifiber connector is aligned with another optical component to be connected.

To achieve the above object, the present invention has the structure as mentioned below. That is, the multi-axes stage of the present invention has a table for mounting an optical component having a plurality of optical paths, first and second actuators for vertically movably supporting said table. Those actuators have control means for adjusting the vertical movement of said table by each actuator separately, and for controlling the movement of said table in at least one of the rotating direction about said optical paths and vertical direction.

Preferably, the multi-axes stage may have a third actuator vertically movable, a converting unit for converting the vertical movement of said actuator into the horizontal movement of said table, in association with said third actuator.

Also preferably, said converting unit may have a swing member vertically swingable on a pivot in accordance with the vertical movement of said third actuator, a first transmitter for contacting said table and transmitting the movement of said swing member in association with the movement of said swing member, and a shaft being arranged parallel to said optical path at a portion where said first transmitter and said table are contacted, and a roller rotating about said shaft.

Further preferably, the multi-axes stage may have a second transmitter being arranged between said table and at least one of said first and second actuators, said second transmitter transmitting the vertical movement of said actuators to said table, and said second transmitter may have a shaft arranged parallel to the optical paths of the optical component mounted on said table, and a roller rotating about the shaft.

According to the multi-axes stage of the present invention, first and second actuators supporting said table are located on at least two portions of the lower surface of said table. Movements of said actuators can be controlled separately by control means, so that said table can be moved in at least one of the rotating direction relative to the optical paths of the optical component and the vertical direction.

When the multi-axes stage further has a third actuator and a converting unit for converting the vertical movement of said actuator into the horizontal movement of said table, said table can be moved in the horizontal direction. Because of the above, the present invention enables an operator to easily align an optical component by providing the multi-axes stage of the invention in an aligning apparatus for optical components and moving an optical component mounted on the table of the multi-axes stage to a desired position to match another optical component to be connected.

Moreover, the table of the multi-axes stage is supported at least two portions of the lower surface by actuators, and thus a cantilever structure is not used unlike the apparatus described in the above "Description of Related Art". Because of the feature, it is rare that the table is deviated when an optical component is set on the table. Therefore, the alignment operation can be finished accurately in a short time because the table cannot be deviated when an optical component is set so that it will not take a long time to finish the alignment operation after the setting of the optical component. Also, even when an optical component mounted on the table and an optical component to be connected are connected by an adhesive, it is possible to connect the optical components accurately after the alignment of the components has been made, since the table cannot be moved by a shrinkage force of the adhesive.

Also, since the converting unit has a swing member, a first transmitter, a shaft and a roller, the friction caused between the transmitter and the side surface of the table can be reduced by the rotating of the roller. Because of this, the vertical movement of the table can be made accurately, and thus, it is possible to further accurately make an alignment of an optical component mounted on the table.

Further, since a second transmitter having a roller is arranged between the table and at least one of the first and second actuators, the friction caused by the second transmitter and the table can be reduced by the rotation of the roller. Because of this, the horizontal movement of the table can be made accurately, and therefore, it is possible to further accurately make an alignment of an optical component mounted on the table.

The objects as mentioned above as well as other objects, features and advantages of the invention will become clearer from the following detailed explanations based on attached drawings.

BRIEF DESCRIPTION OF THE DRAWINGS

FIGS. 12A to 12C are partial front views illustrating movement of the multi-axes stage;

DETAILED DESCRIPTION OF THE PREFERRED EMBODIMENTS

Embodiments of the present invention will be explained on the basis of the drawings, down below. Since optical components and the optical fiber block referred to in this section having the same structure as ones explained in the above "Description of Related Art", the detailed explanations thereon are omitted by reciting their referential numerals in the following explanation.

Figure 1:
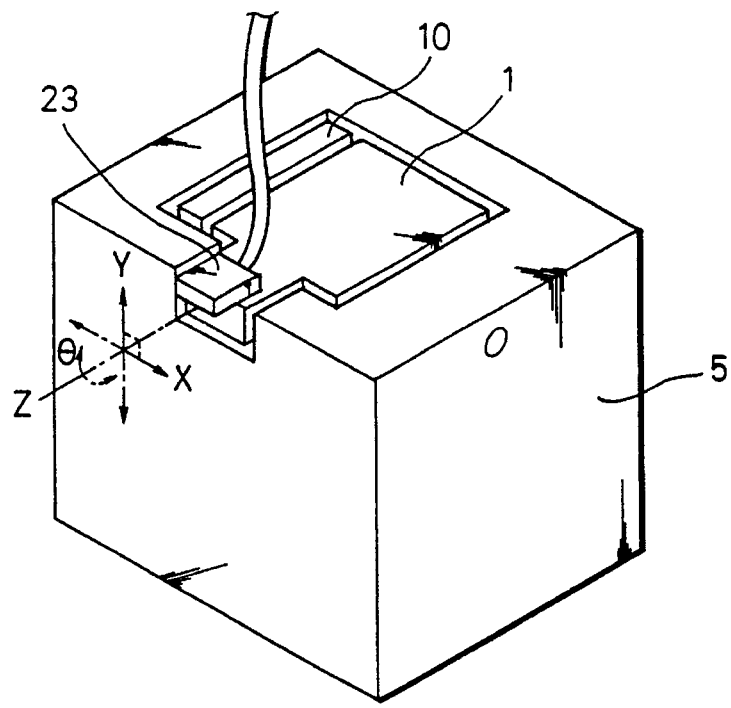
FIG. 1 is a perspective view of a first embodiment of the multi-axes stage of the present invention.
Figure 2:
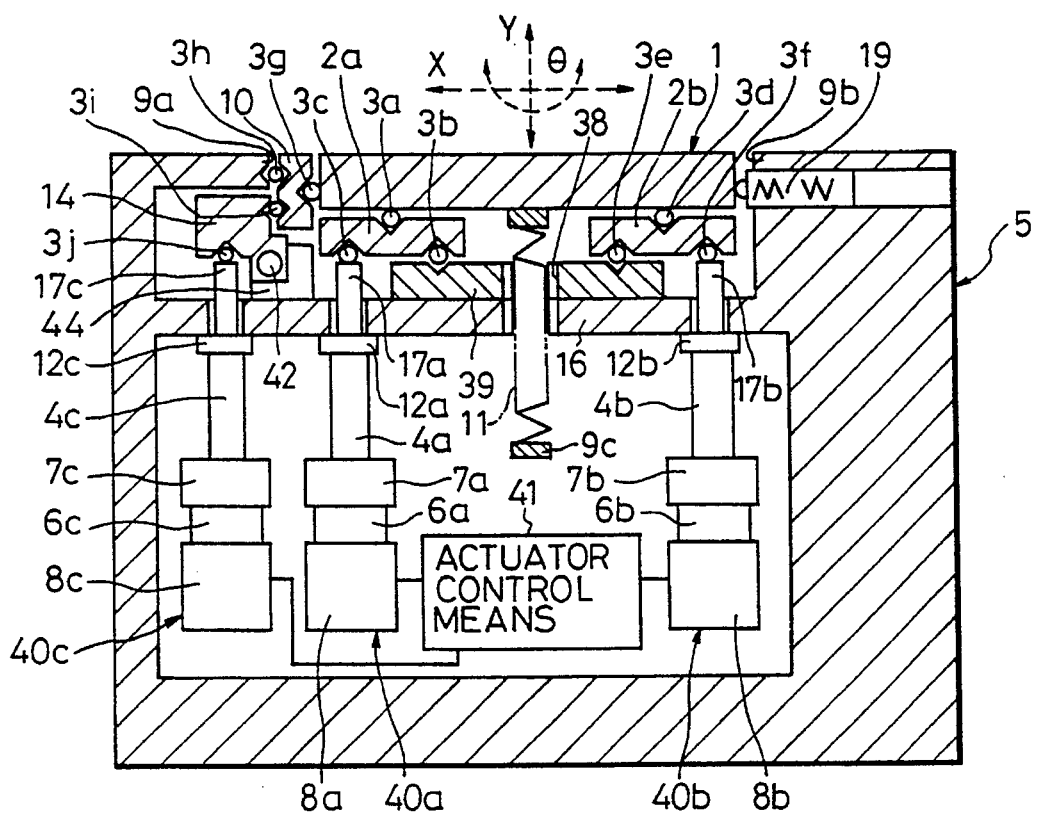
FIG. 2 is a sectional front view of the multi-axes stage of FIG. 1.

FIGS. 1 and 2 show a first embodiment of the multi-axes stage. FIG. 1 is a perspective view of the multi-axes stage, and FIG. 2 is a sectional front view of the multi-axes stage.

In FIGS. 1 and 2, the inner upper portion of apparatus frame 5 has table 1 for removably mounting an optical component like optical fiber block 23. One end portion of table 1 is pushed leftwards in FIG. 2 by ball plunger 19 arranged close to frame 9b of apparatus frame 5. In this case, the optical axes of optical fibers provided in optical fiber block 23 are directed in the Z direction of FIG. 1. The other side of table 1 has rectangular block 10. Shaft 3g is provided between table 1 and block 10, and shaft 3h is provided between block 10 and frame 9a of apparatus frame 5.

Figure 3:
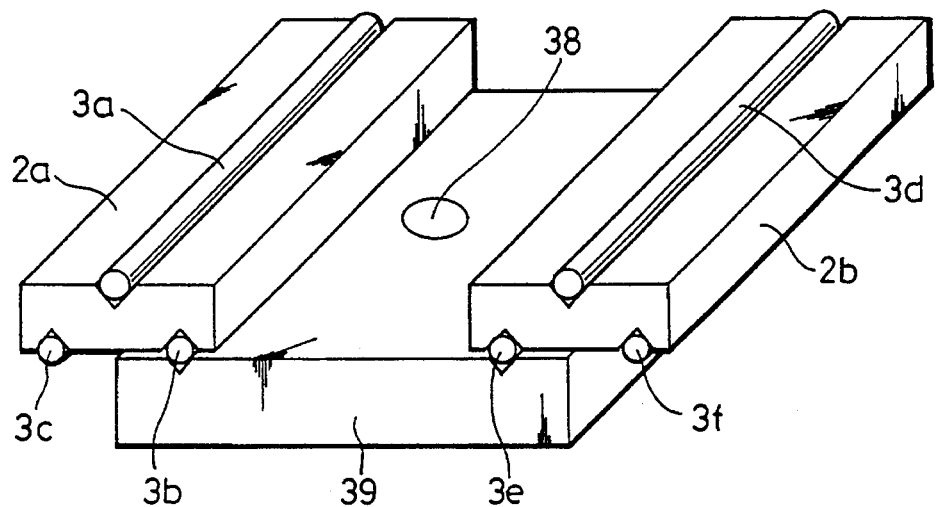
FIG. 3 is a perspective view of a second transmitter.

One end of the lower portion of table 1 has rectangular block 2a with shaft 3a therebetween, and the other end has rectangular block 2b with shaft 3d therebetween. Supporting plate 39 having spring bore 38 at the center is provided under blocks 2a and 2b with shafts 3b and 3e interposed therebetween. Supporting plate 39 is fixed to internal plate 16 of apparatus frame 5, having a spring bore at the center thereof. As shown in FIG. 3, shafts 3a, 3b, 3d, 3e are housed in V-shaped grooves of blocks 2a and 2b, and supporting plate 39, respectively. As shown in FIG. 1, those shafts are just interposed between table 1 and block 2a, block 2b and supporting plate 39, table 1 and block 2b, or block 2b and supporting plate 39, but those shafts are not fixed.

As shown in FIG. 2, pulling spring 11 is inserted into spring bore 38 of supporting plate 39 and said spring bore of internal plate 16. Pulling spring 11 is hooked on the center lower surface of table 1 at one end, and on hook plate 9c of apparatus frame 5 at the other end. Therefore, table 1 is being pulled downwards by pulling spring 11.

Actuators 40a and 40b are fitted through micrometer housings 12a and 12b (hereinafter called "housing") on internal plate 16 located under table 1.

Actuator 40a has motor 8a, coupling 6a, reduction gears 7a and micrometer head (hereinafter called "head") 4a. The tip portion of screw shaft 17a of head 4a is projected above internal plate 16, and is contacted to shaft 3c. Shaft 3c is provided in a V-shaped groove formed on block 2a, and is sandwiched between block 2a and screw shaft 17a. Similarly, actuator 40b has motor 8b, coupling 6b, reduction gears 7b and head 4b. The tip portion of screw shaft 17b of head 4b is contacted to shaft 3f. Shaft 3f is sandwiched between block 2b and screw shaft 17b.

Female screws are provided on the inside of housing 12a and 12b, and a male screw provided on screw shaft 17a and 17b of heads 4a and 4b is screwed into housings 12a and 12b. When torque of motor 8a is transmitted to head 4a through coupling 6a and a reduction gears 7a, said male screw provided on screw shaft 17a of head 4a turns round while said male screw is being screwed into housing 12a. Accordingly, screw shaft 17a is moved in the vertical direction with respect to actuator 40a. As mentioned above, head 4a works as a converting unit to convert the torque of motor 8a into a vertical motion of screw shaft 17a. Screw shaft 17b of actuator 40b also has the same function as screw shaft 17a of actuator 40a.

Control means 41 is connected to actuators 40a and 40b. Control means 41 controls torques or the like of motor 8a of actuator 40a and motor 8b of actuator 40b separately, to regulate the vertical shift of screw shafts 17a and 17b.

In the above embodiment, a second transmitter for transmitting the vertical shift of screw shaft 17a of actuator 40a to table 1 comprises block 2a and shafts 3a, 3b and 3c. Similarly, a second transmitter for transmitting the vertical shift of screw shaft 17b of actuator 40b to table 1 comprises block 2b and shafts 3d, 3e and 3f.

Converting block 14 is provided to the side of block 10 with shaft 3i therebetween. Converting block 14 is tacked to tacking plate 44 by axis 42, and tacking plate 44 is fixed to internal plate 16 of apparatus frame 5. Actuator 40c is provided under converting block 14 with shaft 3j therebetween.

Similar to actuators 40a and 40b, actuator 40c has motor 8c, coupling 6c, reduction gears 7c and head 4c. Screw shaft 17c of head 4c is screwed into housing 12c, and a tip thereof is contacted to shaft 3j.

Shafts 3a to 3j are arranged parallel to optical paths of an optical component like optical fiber block 23, which are placed on table 1.

Control means 41 is connected to actuator 40c. Control means 41 controls actuator 40c, separate from the control of actuators 40a and 40b, so that the vertical shift of screw shaft 17c provided in actuator 40c can be independently adjusted.

Converting block 14 and block 10 function a converting unit for converting the vertical movement of screw shaft 17c of actuator 40c into the horizontal movement (in the X-axis direction in FIG. 2) of table 1, in association with actuator 40c. At that time, converting block 14 functions as a swing member swinging up and down about shaft 42 as a pivot, when the vertical movement of actuator 40c is transmitted to converting block 14. Block 10 functions as the first transmitter for transmitting the horizontal movement of converting block 14 to table 1, in association with converting block 14.

The multi-axes stage of the present embodiment has the structure as mentioned above. Usually, blocks 2a and 2b as well as converting block 14 are arranged parallel to internal plate 16 and the bottom surface of apparatus frame 5. Control means 41 drives actuators 40a, 40b and 40c separately, so that the vertical shift of screw shafts 17a to 17c can be adjusted separately. Accordingly, blocks 2a, 2b and 10 and converting block 14 can be moved separately. Therefore, table 1 can be moved in the vertical direction (Y-axis direction in FIG. 2), in the horizontal direction (X-axis direction in FIG. 2), and the rotating direction (illustrated by θ in FIG. 2) about said optical fibers of optical fiber block 23 mounted on table 1.

Figure 4A:
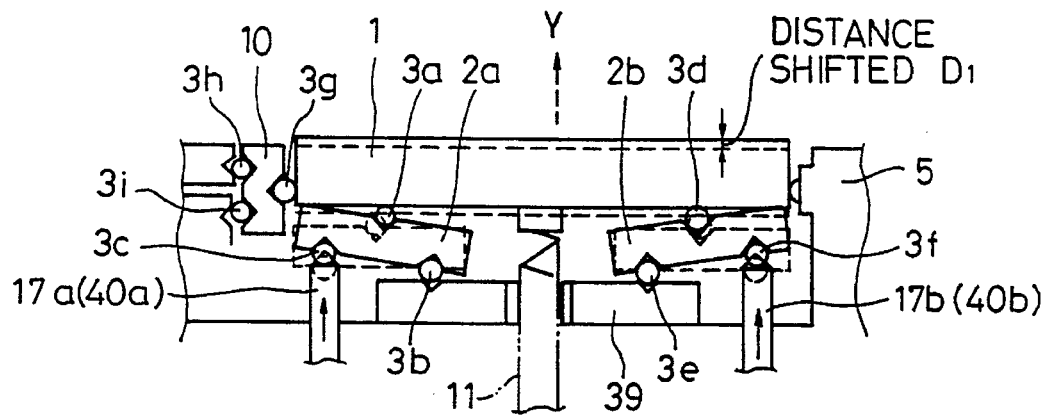
FIGS. 4A to 4C are partial front views illustrating movement of the multi-axes stage.
Figure 4B:
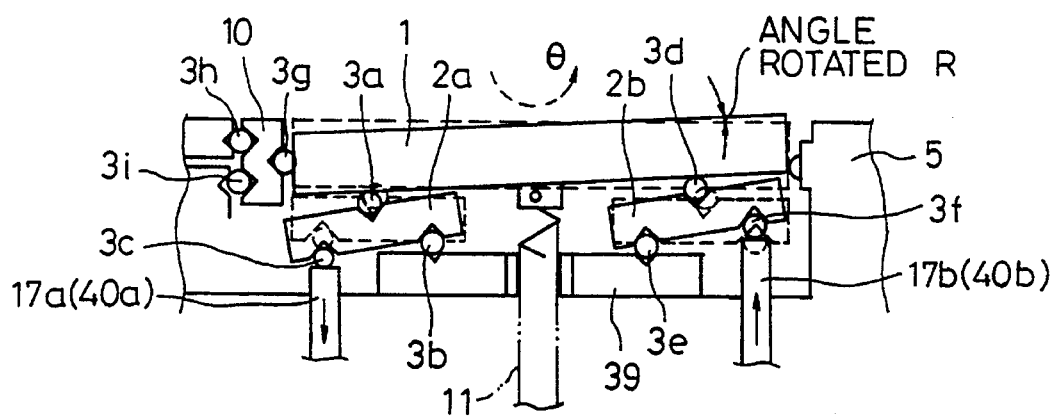
Figure 4C:
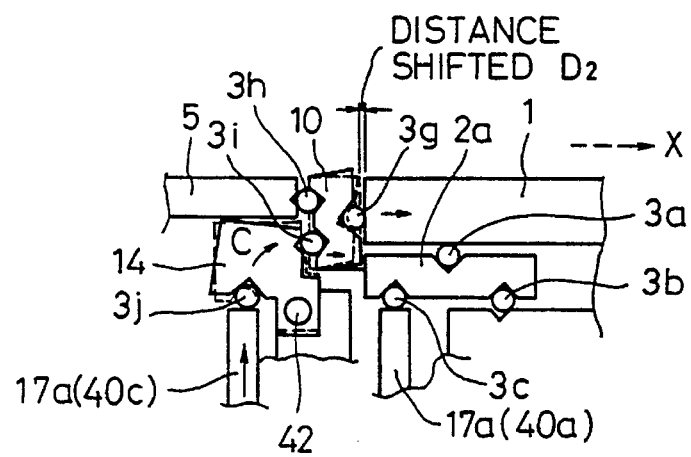

Next, operations of said multi-axes stage will be now explained on the basis of FIGS. 4A to 4C.

As an example, control means 41 drives actuator 40a and actuator 40b only to shift screw shafts 17a and 17b at the same distance (for instance, 1 μm) upwards as illustrated by the arrow, as shown in FIG. 4A.

Then, one end portion of each 2a and 2b is lifted up pivotally about shafts 3b and 3e contacting the other end portion of blocks 2a and 2b, so that table 1 can be lifted upwards along the Y axis. As a result, table 1 is moved upwards from the usual position shown by broken lines to the position illustrated by solid lines, that is, table 1 is moved upwards by the distance D1 as shown in FIG. 4A.

In addition, under the above situation, if screw shafts 17a and 17b are moved downwards in the direction opposite to the arrow by making motors 8a and 8b of actuators 40a and 40b driving reversely, blocks 2a and 2b and table 1 return to the original position, respectively.

As shown in FIG. 4B, control means 41 shifts screw shaft 17a of actuator 40a downwards illustrated by the arrow, for example, at the distance of 1 μm, on the contrary, screw shaft 17b of actuator 40b is moved upwards as shown by the arrow, for example, at the distance of 1 μm.

Then, as shown in FIG. 4B, block 2b and block 2a are inclined to ascend rightwards pivotally about shafts 3e and 3b, respectively. As a result, table 1 is inclined in the θ direction by the angle R of rotation, to move from the normal position shown by broken lines to the position shown by solid lines.

Further, as is shown in FIG. 4C, control means 41 drives actuator 40c, to move screw shaft 17c upwards. Then, as is illustrated, converting block 14 is rotated about shaft 42 as a pivot in the vertical direction as shown by arrow C. As a result, converting block 14 is inclined to shift from the position shown by broken lines to the position shown by solid lines. Because of this, shaft 3i is pushed rightwards to move the lower portion of block 10 rightwards, with the result that block 10 pushes table 1 through shaft 3g while block 10 is being inclined. Then, table 1 is moved rightwards in the X axis direction by the distance D2, as shown in FIG. 4C.

When actuator 40c is returned to the original position by control means 41, table 1 is pushed leftwards in FIG. 4C by ball plunger 19 (See FIG. 2). Therefore, converting block 14 and block 10 are returned to the original positions by conducting the above operations in the reversed order, with the result that table 1 returns back to the original position.

According to the present embodiment, table 1 can be moved freely in the X axis direction, the Y axis direction, the θ direction. Therefore, an optical component like optical fiber block 23 placed on table 1 is slightly moved to match optical component 13 to be coupled, so that the alignment of optical axes of an optical component placed on table 1 and the other optical component 13 to be coupled can easily be made.

Also, as shown in FIG. 2, table 1 is supported at the side portions by actuators 40a and 40b, and thus, table 1 and others do not make a cantilever structure, unlike the apparatus described in the above "Description of Related Art". Therefore, there is little possibility in the multi-axes stage of the present invention that table 1 is slid out of position by the stress applied to table 1 when an optical component like optical fiber block 23 is set on table 1.

Actually, when the shift of the position is measured when optical fiber block 23 is placed on table 1, it has been confirmed that the shift is less than 0.1 μm. Therefore, the multi-axes stage of the present invention does not need a long time to conduct an alignment operation since table 1 is not slid when an optical component is set on table 1. Thus, the present invention can finish the alignment in a short time.

Further, according to this embodiment of the multi-axes stage, even if a contractile force may be applied to table 1 when an optical component placed on table 1 is fixed to an optical component to be coupled by an adhesive after the alignment operation, table 1 is not slid by the force. Therefore, the alignment positions of an optical component and the other optical component to be coupled are not shifted, with the result that those optical components can be connected at the alignment positions with a desired accuracy.

Figure 5:
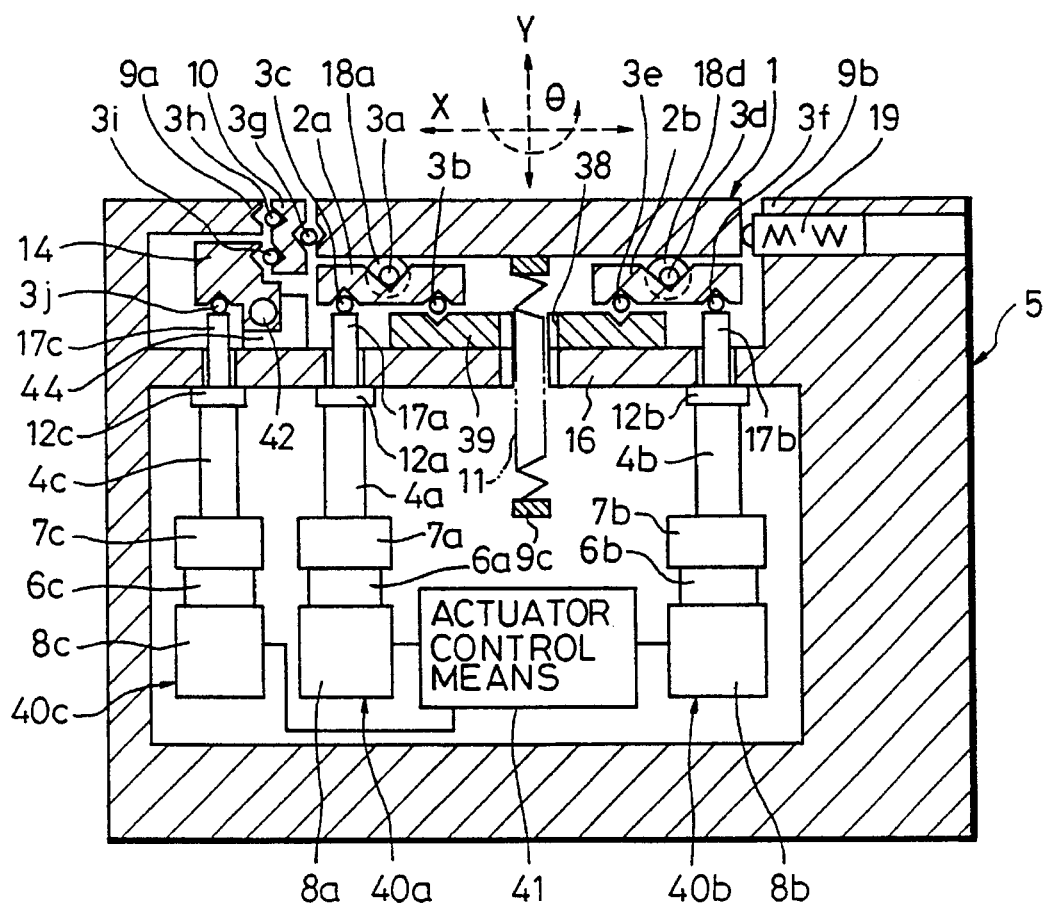
FIG. 5 is a sectional front view of a second embodiment of the multi-axes stage.
Figure 6:
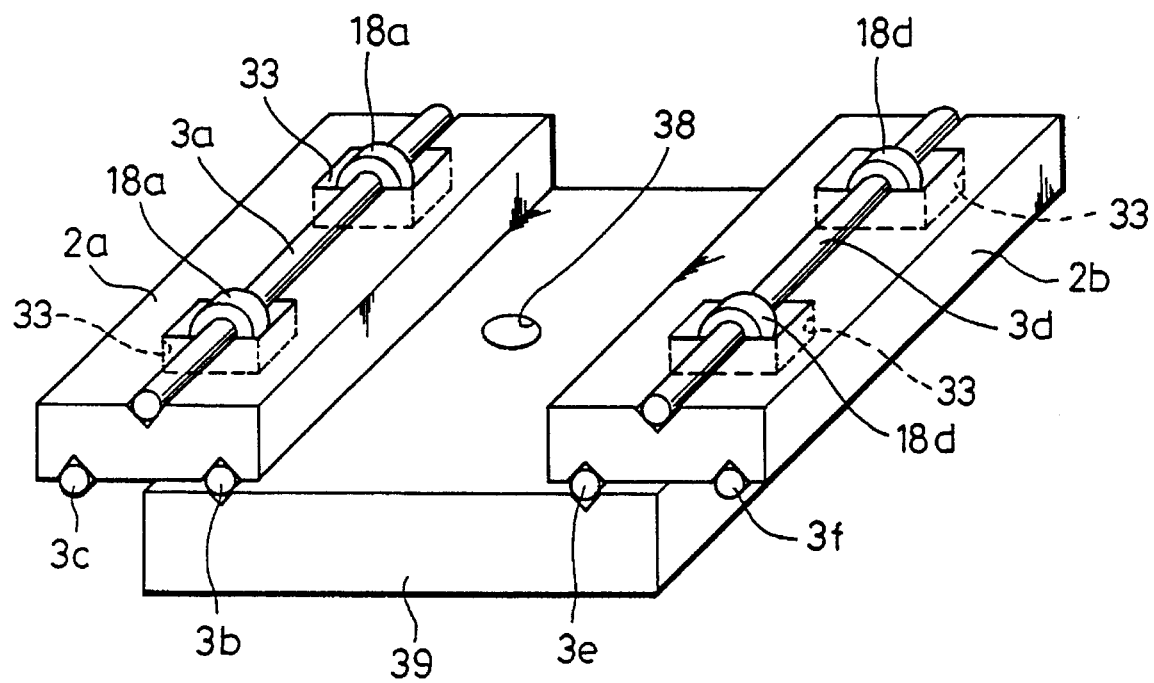
FIG. 6 is a perspective view of a second transmitter.

FIG. 5 is a sectional front view of the second embodiment of the multi-axes stage. The feature of the embodiment different from those of the first embodiment is that a second transmitter for transmitting vertical shifts of screw shafts 17a and 17b in actuators 40a and 40b to table 1 comprises, as shown in FIG. 6, shafts 3a and 3d arranged parallel to optical paths of an optical component placed on table 1, and rolling bearings 18a and 18d. The other features of the embodiment are the same as those of the first embodiment.

Rolling bearings 18a and 18d are housed in housing grooves 33 which are formed in blocks 2a and 2b, and the upper halves of the bearings are projected above blocks 2a and 2b. As is shown in FIG. 5, the upper portion of rolling bearings 18a and 18d is contacted to the lower surface of table 1, so that table 1 is supported by rolling bearings 18a and 18d.

The multi-axes stage of the present embodiment has the structure as mentioned above, and thus actuators 40a, 40b, and 40c are driven by control means 41 separately, in the same manner as the above first embodiment. Therefore, the vertical shift of screw shafts 17a, 17b, and 17c regarding each of actuators 40a, 40b, and 40c are adjusted separately, so that table 1, as shown in FIGS. 7A to 7C, can be moved in the horizontal direction (in the X axis direction in FIG. 5), the vertical direction (in the Y axis direction in FIG. 5), and rotating direction (the θ direction in FIG. 5) about said optical fibers of optical fiber block 23 placed on table 1).

Figure 7A:
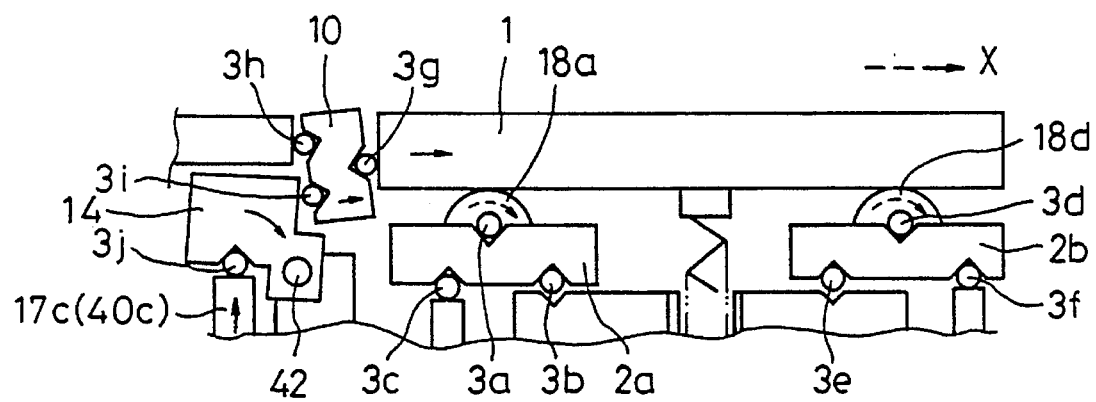
FIGS. 7A to 7C are partial front views illustrating movement of the multi-axes stage.
Figure 7B:
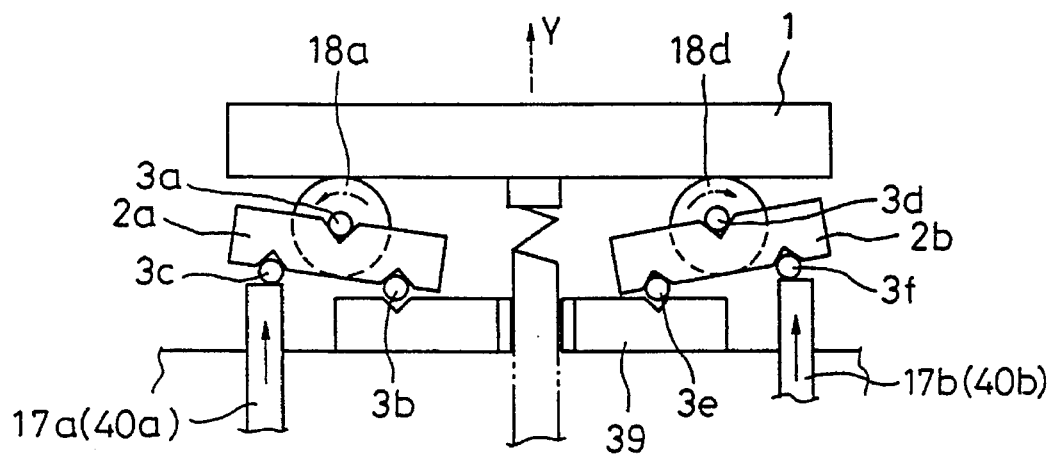
Figure 7C:
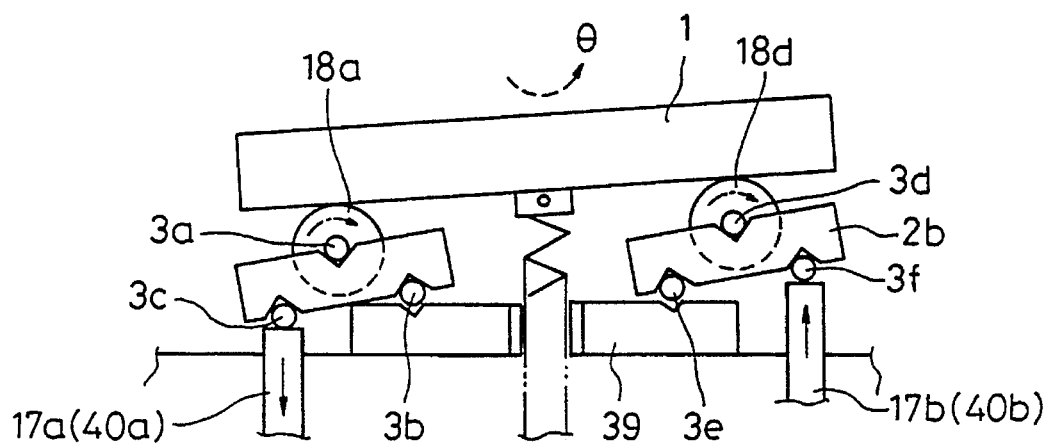

At that time, as shown in FIG. 7A, rolling bearings 18a and 18d are rotated about shafts 3a and 3d respectively, as is illustrated by the alternate long and short dash line.

The force needed for the rotation is considerably smaller than the force needed to slide table 1 on shafts 3a and 3d without rolling bearings 18a and 18d in the X axis direction. Therefore, the embodiment of the multi-axes stage can reduce the friction force caused between table 1 and shafts 3a and 3d when table 1 is moved.

As a result, there is little residual stress caused by said friction force in the multi-axes stage of the present embodiment, and thus, the vertical shift of screw shaft 17c of actuator 40c can be transmitted to table 1 steadily, to make a horizontal movement of table 1. Therefore, the present embodiment can move table 1 more accurately than said first embodiment, so that the present embodiment can achieve highly accurate alignment operation of an optical component placed on table 1.

In FIG. 5, when table 1 is moved in the Y axis direction or the θ direction by driving actuators 40a and 40b, the movement of table 1 causes a friction force between table 1 and bearings 18a and 18d. Then, as shown in FIGS. 7A and 7B, rolling bearings 18a and 18d are rotated in the direction illustrated by the arrow of alternate long and short dash lines, so that said friction force is reduced. As a result, no residual stress caused by the friction remains, to achieve the same advantages as one achieved regarding the movement along the X axis direction.

Figure 8:
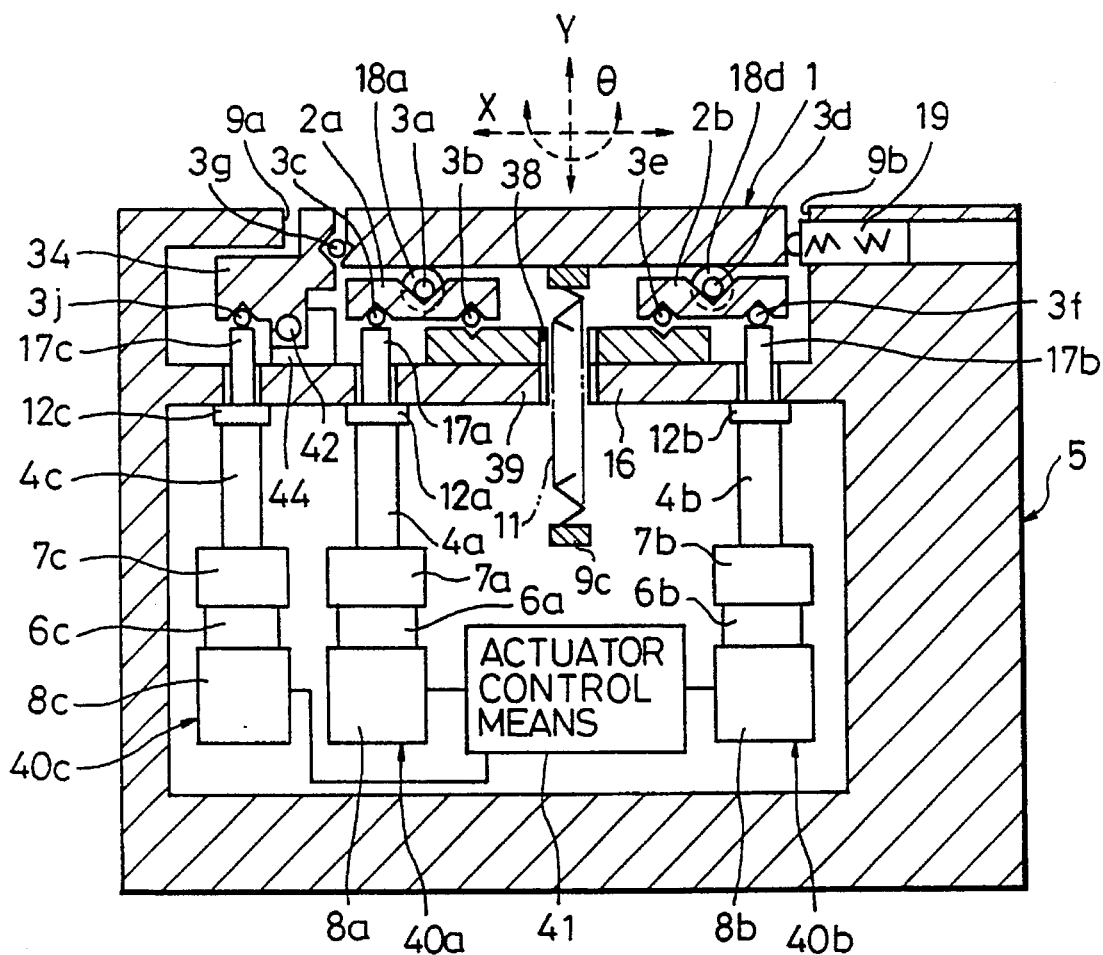
FIG. 8 is a sectional front view of a third embodiment of the multi-axes stage.

FIG. 8 is a sectional front view of a third embodiment of the multi-axes stage. The feature of the present embodiment different from said second embodiment is that converting arm 34 is provided instead of converting block 14 and block 10, to make a converting unit for converting the vertical movement of actuator 40c into a horizontal movement of table 1.

In detail, the multi-axes stage of the present embodiment has a converting unit comprising converting arm 34 in which the swing member as mentioned in the above second embodiment and the first transmitter are incorporated. The other structural features are the same as the second embodiment.

Similar to said second embodiment, the present embodiment makes table 1 move in the Y axis direction and the θ direction by separately controlling the vertical shift of actuators 40a and 40b with control means 41.

Figure 9:
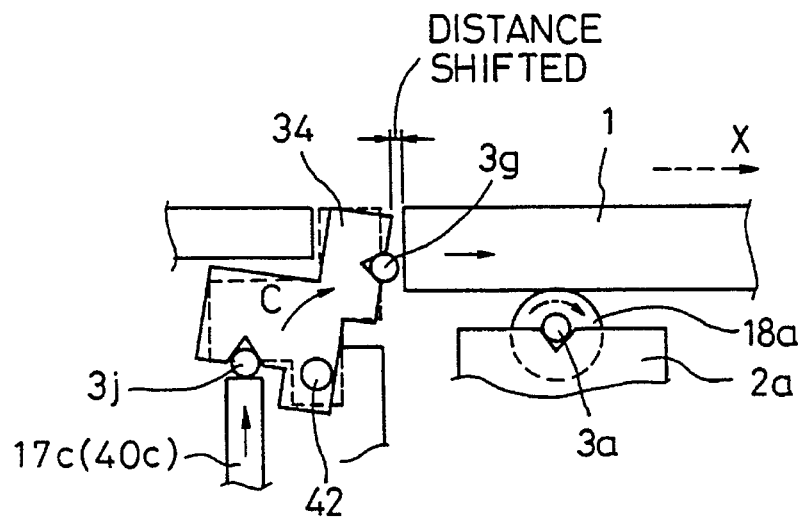
FIG. 9 is a partial front view illustrating the movement of the table in the X-direction.

Also, as is shown in FIG. 9, when screw shaft 17c is lifted up by actuator 40c, converting arm 34 is pivotally swung up and down about shaft 42 as illustrated by arrow C. As a result, converting arm 34 is inclined to shift to the position shown by broken lines to the position shown by solid lines, so that shaft 3g is pressed rightwards to move table 1 in the X axis direction.

Then, when actuator 40c returns to the original position, converting arm 34 returns to the original position and table 1 is moved leftwards until table 1 returns to the initial position, because table 1 as well as converting arm 34 is pressed leftwards by ball plunger 19.

Therefore, the present embodiment can achieve the same advantage as said second embodiment. Further, the multi-axes stage of the present embodiment has converting arm 34 in which the swing member and the first transmitter comprising said converting unit are incorporated. Because of this, the number of components of the present embodiment is less than that of the second embodiment wherein converting block 14 functioning as the swing member and block 10 functioning as the first transmitter are separate. Therefore, the present embodiment can be assembled easily, and thus, the cost can be reduced.

Figure 10:
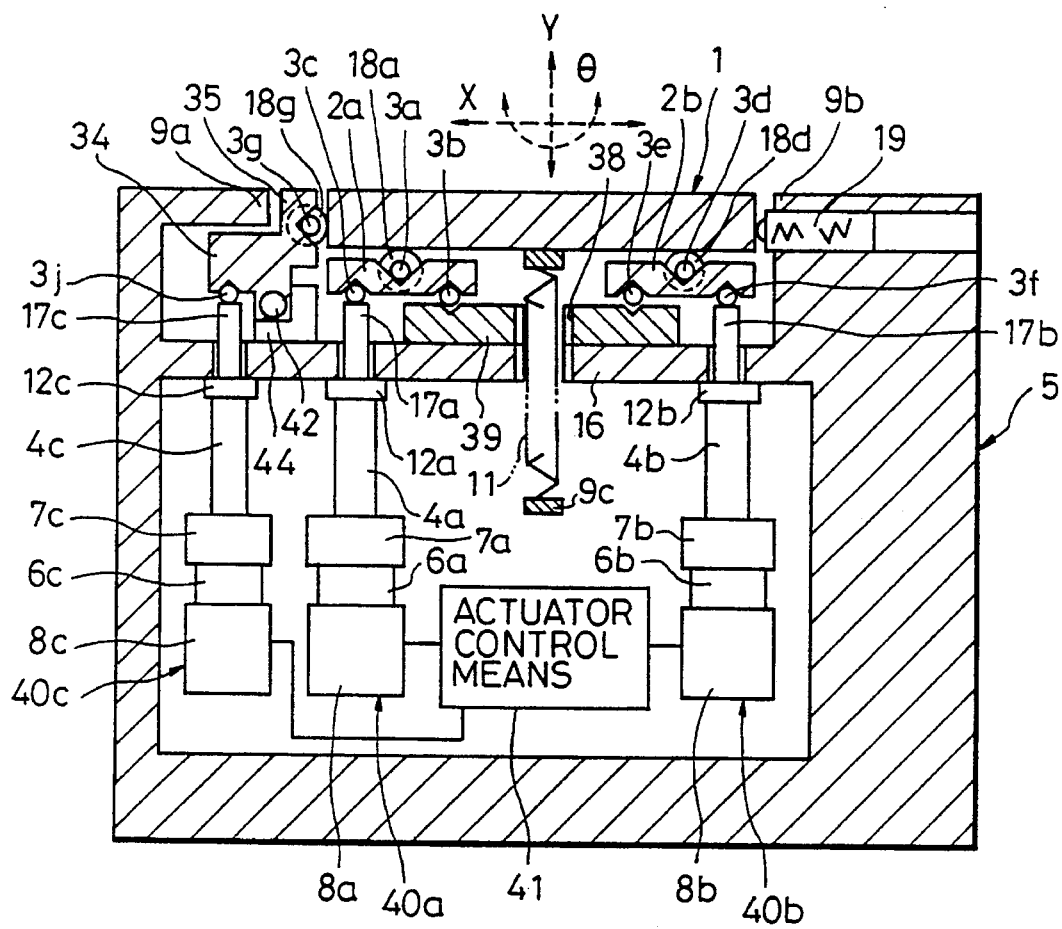
FIG. 10 is a sectional front view of a fourth embodiment of the multi-axes stage.
Figure 11:
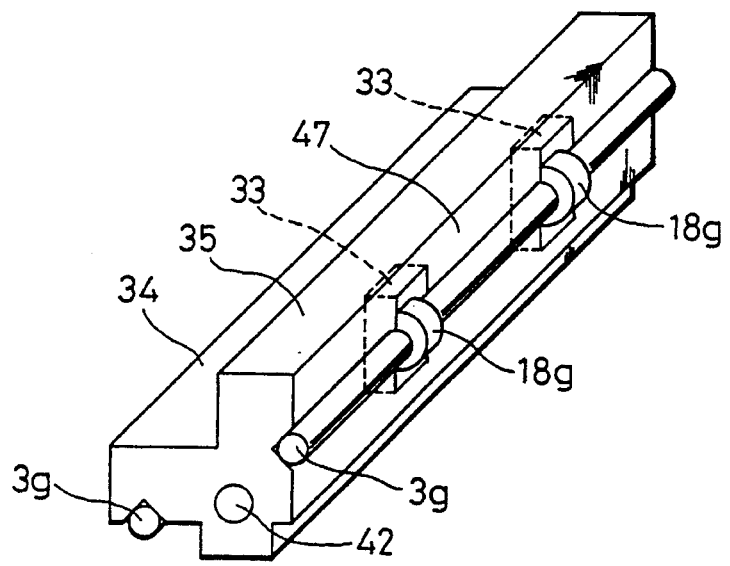
FIG. 11 is a perspective view of a converting arm using roller bearings, according to the fourth embodiment.

FIG. 10 is a sectional front view of a fourth embodiment of the multi-axes stage. The feature of the present embodiment different from those of said third embodiment is, as shown in FIG. 11, that each rolling bearing 18g is provided to function as a roller rotating about shaft 3g, that the left half of each rolling bearing 18g is housed in a housing groove 33 formed on side surface 47 of converting arm 34, and that the right half is provided to project from side surface 47 of converting arm 34. The other structures are the same as said third embodiment.

Shaft 3g functions as a shaft arranged parallel to an optical path of an optical component placed on table 1. Side surface 47 of converting arm 34 is a contacting portion of first transmitter 35 of converting arm 34 and table 1. The horizontal movement of converting arm 34 is transmitted to table 1 through rolling bearings 18g.

The multi-axes stage of the present embodiment has the structure as mentioned above, the movement of table 1 in the X axis direction, the Y axis direction and the θ direction, in the same manner as the table 1 in said third embodiment. In the multi-axes stage of the present embodiment, converting arm 34 has rolling bearing 18*g*. Thus, as shown in FIGS. 12A to 12C, when table 1 is moved, rolling bearing 18*g* is rotated depending on the friction between table 1 and bearing 18*g*, so that the friction force caused between table 1 and shaft 3*g* can be reduced.

The present embodiment has the same advantages as said third embodiment. The multi-axes stage of the present embodiment can further accurately move table 1 since the friction of table 1 and shaft 3*g* is reduced by the rotation of rolling bearings 18*g*. As a result, the alignment operation for an optical component placed on table 1 can be made further accurately.

The multi-axes stage of the present invention is not limited to the above embodiments. The present invention can has various embodiments other than the above-mentioned ones.

For example, in the above embodiments, table 1 is movable in the X axis direction, the Y axis direction, and the θ direction in the drawings because three actuators 40*a*, 40*b* and 40*c* are provided under table 1, and because control means 41 drives those actuators separately.

Figure 13:
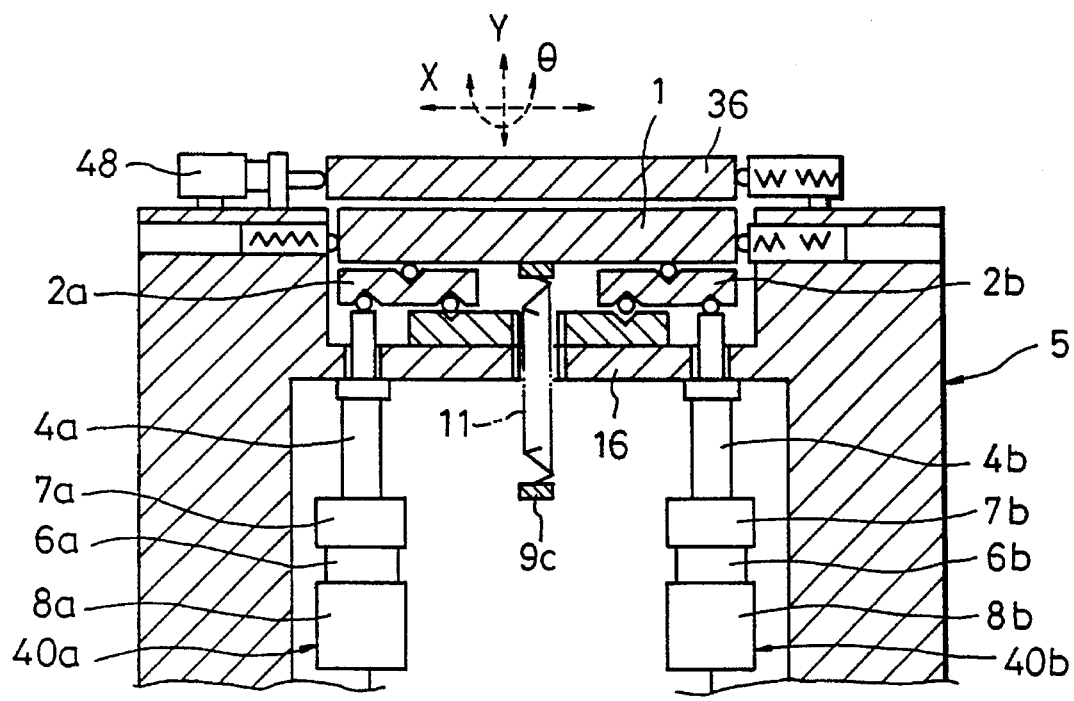
FIG. 13 is a sectional front view of a modification of the multi-axes stage of the present invention, with a mounting plate movably mounted on the table.

As shown in FIG. 13, table 1 may be moved in the Y axis direction and the θ direction by actuators 40*a* and 40*b* provided under table 1, and mounting plate 36 may be provided on table 1 to set an optical component thereon, in a manner such that mounting plate 36 can be moved in the X axis direction by X axis motor 48 or the like.

As mentioned above, in the case that means for moving an optical component in the X axis direction is provided on table 1, mounting plate 36 as well as table 1 are supported upwards by actuators 40*a* and 40*b*. Therefore, mounting plate 36 or table 1 cannot be moved when an optical component is placed on mounting plate 36, with the result that the same advantages as the above embodiments can be achieved.

Also, actuators 40*a* to 40*c* comprise heads 4*a* to 4*c*, motors 8*a* to 8*c*, and others in said embodiments, but actuators 40*a* to 40*c* may not necessarily comprise heads 4*a* to 4*c*, motors 8*a* to 8*c*, and other elements. For example, those actuators may comprise a combination of ball screws and motors, or a piezoelectric element and other elements.

Further, said embodiments have three actuators 40*a* to 40*c*, but at least two actuators are sufficient to support table 1. The number or the other factors of actuators are not limited.

For instance, as shown in FIGS. 4A to 4c, 9 and 12A to 12C, actuator 40*c* is provided the lower portion of one end (in the left of the drawings) of table 1, so that table can be horizontally moved rightwards. But, another actuator may be provided at the lower portions of other end of table 1, so that table 1 can also be horizontally moved leftwards.

Furthermore, for example, similar to the first and second embodiments (See FIGS. 2 and 5), in the case where a converting unit for converting the vertical movement of screw shaft 17*c* of actuator 40*c* into the horizontal movement of table 1 comprises converting block 14 and block 10, rollers of rolling bearing 18*g* and the like as shown in FIG. 11 may be provided on shaft 3*g* close to block 10. This structure can reduce the friction between shaft 3*g* and table 1, similar to said fourth embodiment.

Figure 14:
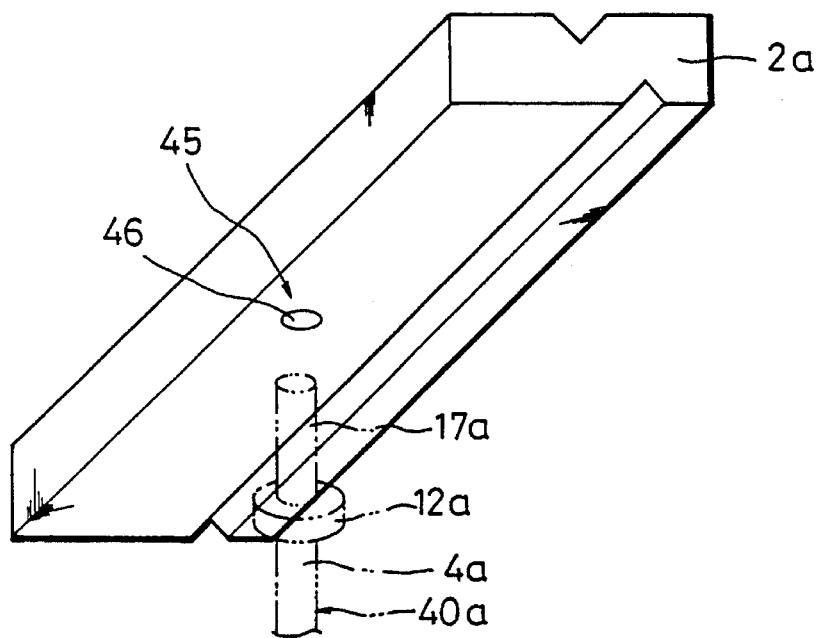
FIG. 14 is a perspective view of a modification of a second transmitter in which a steel ball is provided in place of one of the shafts.
Figure 15:
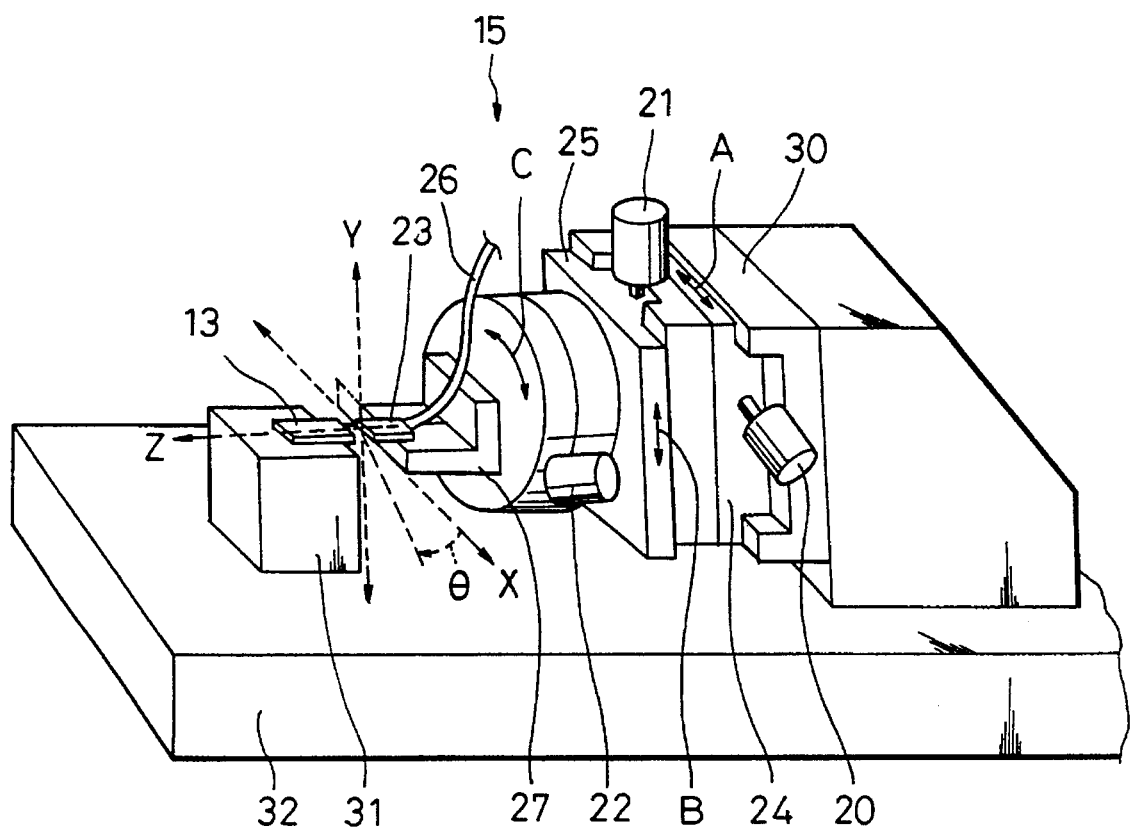
FIG. 15 is perspective view of an alignment apparatus having a multi-axes stage.

Further, for example, as shown in FIG. 14, ball 46 like a steel ball may be provided at contacting portion 45 of block 2*a* where block 2*a* contacts screw shaft 17*a* of actuator 40*a* so that ball 46 can provide a second transmitter for actuator 40*a*, instead of shaft 3*c*. This modification can be also applied to actuator 40*b*.

Moreover, said embodiments are explained on the basis that optical fiber block 23 as an optical component is placed on table 1. The optical component to be placed on table 1 is not limited to an optical fiber block 23, and any other kinds of optical components, for example, an optical waveguide component having a plurality of optical waveguides may be used.

What is claimed is:

1. A multi-axes stage for holding an optical component having a plurality of optical paths, comprising:

a table for mounting the optical component;

first and second actuators which are movable substantially only in a vertical direction, for vertically movably supporting said table;

each said actuator having control means for adjusting vertical movements of said table by each actuator separately, and for controlling movement of said table in at least one of a rotating direction about said optical paths and the vertical direction;

a transmitter arranged between said table and at least one of said first and second actuators, said transmitter transmitting the vertical movement of said actuators to said table; and wherein said transmitter has a shaft arranged parallel to the optical paths of said optical component mounted on said table, and a roller rotating about said shaft.

2. A multi-axes stage for holding an optical component having a plurality of optical paths, comprising:

a table for mounting the optical component;

first and second actuators for vertically movably supporting said table;

each said actuator having control means for adjusting vertical movements of said table by each actuator separately, and for controlling movement of said table in at least one of a rotating direction about said optical paths and the vertical direction;

a third actuator which is vertically movable; and a converting unit for converting vertical movement of said third actuator into horizontal movement of said table, in association with said third actuator.

3. A multi-axes stage according to claim 2, wherein:

said converting unit has a swing member which is vertically swingable on a pivot in accordance with the vertical movement of said third actuator, a first transmitter for contacting said table and transmitting movement of said swing member in association with the movement of said swing member, and a shaft arranged parallel to said optical paths at a portion where said first transmitter and said table are contacted, and a roller rotating about said shaft.

4. A multi-axes stage according to claim 2, wherein:

a transmitter is arranged between said table and at least one of said first and second actuators, said transmitter transmitting the vertical movement of said actuators to said table; and said transmitter has a shaft arranged parallel to the optical paths of said optical component mounted on said table, and a roller rotating about said shaft.

* * * * *